Patented May 23, 1939

2,159,148

UNITED STATES PATENT OFFICE 2,159,148

PRODUCTION OF VALUABLE LIQUID HYDROCARBONS

Hans Haeuber and Josef Hirschbeck, Ludwigshafen-on-the-Rhine, Germany, assignors to I. G. Farbenindustrie Aktiengesellschaft, Frankfort-on-the-Main, Germany No Drawing. Application June 30, 1938, Serial No. 216,754. In Germany July 6, 1937

4 Claims. (Cl. 196—10)

The present invention relates to improvements in the production of valuable liquid hydrocarbons, more particularly such as are useful for use as insulating oils. The process makes use of the polymerization of gaseous olefines.

It is already known that liquid, more or less highly viscous hydrocarbons can be obtained by polymerization of unsaturated gaseous hydrocarbons by means of catalysts of the Friedel-Crafts' reaction. The liquid products thus obtained may be used, depending on their viscosity, either as motor fuels, as for example as benzines or Diesel oils, or as lubricating oils. They are unsuitable, however, for use as insulating oils because especially high requirements are placed on these, in particular as regards viscosity, flashpoint, formation of sludge and dielectric constants.

We have now found that very valuable liquid hydrocarbons which are suitable for use as insulating oils can be obtained by using as initial materials for the polymerization gases containing more than 30 per cent of gaseous olefines, the olefines containing a preponderating amount of butylenes or amylenes or mixtures of the same, and by subjecting the products resulting from the polymerization to both a hydrogenating treatment. and a treatment with superheated steam in the presence of caustic alkalies.

The total content of gaseous olefines in the initial gases used for the polymerization should preferably be considerably higher than 30 per cent, as for example 40 per cent or still more. In addition to butylenes or amylenes or mixtures of the same, the gaseous olefines may consist of ethylene or propylene or mixtures of the same, but the presence of these olefines is not essential. Especially good results are obtained with initial materials the olefines in which consist of propylene and butylenes. Suitable gas mixtures are obtained for example by the catalytic conversion of oxides of carbon, in particular carbon monoxide, with hydrogen, but they may also be recovered from cracking gases or similar olefinic gas mixtures or may be prepared by mixing the single olefines.

Catalysts of the Friedel-Crafts' reaction which are suitable for carrying out the polymerization are for example aluminum chloride, zinc chloride, iron chloride and in particular the halides of boron, especially boron fluoride. The double compounds or complex compounds of the said halides may also be used. The polymerization may be carried out at ordinary, elevated or also reduced temperature and at atmospheric or increased pressure. It takes place very simply by working at atmospheric pressure and about room temperature, preferably while employing boron fluoride which is gaseous under the said conditions. The polymerization may be carried out very simply in the gas phase, but working may also be effected if desired in the liquid phase, for example by liquefying the olefinic gases by increased pressure and subjecting them to polymerization in this state, or by working in the presence of an inert diluent, as for example a benzine consisting as far as possible only of saturated hydrocarbons.

In order to avoid a too far-reaching polymerization, it is preferable, when the desired viscosity has been reached, to remove the reaction products formed immediately from the catalysts, for example by a treatment with water or dilute solutions of caustic alkalies.

The oils thus obtained may if desired be fractionated and then meet the requirements as regards flashpoint and viscosity placed on good insulating oils. However, the formation of sludge is still too great and the dielectric constants too low. These faults are obviated by enriching the polymerization products or their fractions with hydrogen and treating them with superheated steam in the presence of caustic alkalies. The two treatments may be effected in any sequence.

For example the crude oil, which has been treated with water or dilute caustic alkalies for the decomposition of the polymerization catalyst, may be treated with caustic alkali and superheated steam, the distillate thus obtained then being subjected to the treatment with hydrogen. In some cases the pretreatment for the decomposition of the catalyst may even be omitted and the crude polymerization product, still containing the catalyst, directly subjected to the treatment with caustic alkalies and superheated steam.

It is, however, more advantageous to remove the polymerization catalyst from the crude polymerization product in the aforesaid manner, then to subject the latter to a treatment with hydrogen and only then to subject it to the treatment with superheated steam in the presence of caustic alkalies.

The treatment with hydrogen, which leads wholly or partly to a saturation of the polymerization product with hydrogen, is carried out under the conditions known for hydrogenations. Working is effected in the presence of known hydrogenation catalysts among which nickel catalysts have proved very suitable for example. It is preferable to effect the hydrogenation at elevated temperature and preferably also under increased pressure. In all cases, however, the conditions must be so chosen that no splitting takes place during the addition of hydrogen.

For the treatment with superheated steam in the presence of caustic alkalies, small amounts of the latter are sufficient, as for example up to 5 per cent of the amount of oil. The caustic alkali, as for example caustic soda or caustic potash, is advantageously added in solid form, but working may also be effected if desired in the presence of small amounts of suitable solvents, preferably water. By the treatment with superheated steam, the oil is obtained in the distillate. It may be directly fractionated by this treatment or also split up into fractions by a subsequent distillation in vacuo.

The oils thus obtained correspond to or are even superior to the best insulating oils obtained from mineral oils as regards their properties, especially as regards the boiling range, flash-point, viscosity, iodine value, acid value, saponification value, formation of sludge and dielectric constants. They therefore satisfy the highest requirements placed on insulating oils. The fractions of comparatively low boiling point simultaneously formed are neutral, pure hydrocarbons and may be used for example as benzines or Diesel oils or in other suitable way.

The following example will further illustrate how this invention may be carried out in practice, but the invention is not restricted to this example.

*Example*

Through a tube 150 centimeters long and 75 millimeters in internal diameter which is filled with Raschig rings there are led per hour at from 10° to 15° C. at atmospheric pressure about 100 liters of a gas mixture which has been obtained by the reaction of carbon monoxide with hydrogen and which has the following composition:

|  | Per cent (about) |
|---|---|
| Carbon dioxide | 12.00 |
| Carbon monoxide | 1.25 |
| Hydrogen | 1.00 |
| Ethylene | 1.70 |
| Propylene | 20.80 |
| Butylene | 19.60 |
| Amylene and higher unsaturated hydrocarbons | 16.10 |
| Methane and ethane | 1.75 |
| Propane | 11.30 |
| Butane and higher saturated hydrocarbons | 14.50 |

After moistening with water, this gas mixture is supplied to the upper end of the vertically arranged tube, and about 3.3 per cent by volume of boron fluoride are simultaneously mixed therewith. At the lower end of the tube the constituents which have remained gaseous are led away separately. They consist mainly of saturated hydrocarbons and contain only small amounts of unsaturated hydrocarbons, in particular ethylene. The liquid products formed (about 140 grams per hour) are also continuously withdrawn at the lower end of the tube and immediately washed with dilute caustic potash solution for the destruction of the catalyst and then neutralized with strong caustic potash solution. An oil is obtained which still has a saponification value of 0.338 and an iodine value of more than 57. This is allowed to trickle at from 140° to 150° C. under a pressure of 200 atmospheres over a nickel catalyst in an atmosphere of hydrogen. There are then added to the hydrogenated oil 2.5 per cent of solid caustic potash and it is treated with superheated steam. The lower boiling fractions thus pass over first; these may be used as benzines and Diesel oils. The fractions suitable as insulating oils then pass over while a slight residue (less than 5 per cent) remains in the body of the still. The distillate oil is fractionated under reduced pressure, whereby there is obtained in an amount of more than 51 per cent a fraction which is eminently suitable as an insulating oil and which has the following properties:

| | |
|---|---|
| Flashpoint | Above 170° C. |
| Specific gravity (20°) | 0.810 |
| Acid value | 0 |
| Saponification value | 0 |
| Iodine value | 0 |
| Viscosity at 20° | 4.91° Engler |
| Viscosity at 38° | 2.09° Engler |

What we claim is:

1. The process of producing a hydrocarbon oil which comprises subjecting to polymerization by means of a catalyst of the Friedel-Crafts' reaction a gas containing more than 30 per cent of gaseous olefines, the olefines containing a preponderating amount of olefines selected from the group consisting of the butylenes and amylenes, and subjecting the product resulting from the polymerization in either order to both a hydrogenating treatment and a treatment with superheated steam in the presence of a caustic alkali.

2. The process of producing a hydrocarbon oil which comprises subjecting to polymerization by means of a catalyst of the Friedel-Crafts' reaction a gas containing more than 30 per cent of gaseous olefines, the olefines containing a preponderating amount of olefines selected from the group consisting of the butylenes and amylenes, subjecting the product resulting from the polymerization to a hydrogenating treatment and treating the resulting product with superheated steam in the presence of a caustic alkali.

3. The process as claimed in claim 1, in which the gas subjected to polymerization contains at least 40 per cent of gaseous olefines.

4. The process as claimed in claim 1, in which the gaseous olefines essentially comprise propylene and a preponderating amount of butylenes.

HANS HAEUBER.
JOSEF HIRSCHBECK.